(12) United States Patent
Schreiber et al.

(10) Patent No.: US 11,735,944 B1
(45) Date of Patent: Aug. 22, 2023

(54) SYSTEM AND METHOD FOR USING UNRECOVERABLE ENERGY IN A BATTERY CELL

(71) Applicant: BETA AIR, LLC, South Burlington, VT (US)

(72) Inventors: Stuart Denson Schreiber, South Burlington, VT (US); Tyler John Skroski, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/966,718

(22) Filed: Oct. 14, 2022

(51) Int. Cl.
| | | |
|---|---|---|
| *H02J 7/00* | (2006.01) | |
| *H01M 10/44* | (2006.01) | |
| *H01M 10/42* | (2006.01) | |
| *B60L 58/10* | (2019.01) | |
| *B64C 29/00* | (2006.01) | |

(52) U.S. Cl.
CPC ..... *H02J 7/007182* (2020.01); *H01M 10/425* (2013.01); *H01M 10/44* (2013.01); *B60L 58/10* (2019.02); *B60L 2200/10* (2013.01); *B64C 29/0008* (2013.01); *H01M 2010/4278* (2013.01)

(58) Field of Classification Search
CPC ........... H02J 7/007182; H01M 10/425; H01M 10/44; B60L 58/10
USPC .......................................................... 320/136
See application file for complete search history.

(56) References Cited

U.S. PATENT DOCUMENTS

| | | | | |
|---|---|---|---|---|
| 10,388,995 B2 * | 8/2019 | Matsubara | .......... | H01M 10/482 |
| 2022/0137141 A1 * | 5/2022 | Kondo | ................ | H02J 7/00306 |
| | | | | 320/132 |

* cited by examiner

*Primary Examiner* — Nathaniel R Pelton
(74) *Attorney, Agent, or Firm* — Caldwell Intellectual Property Law

(57) ABSTRACT

A system and method for using unrecoverable energy in a battery cell is disclosed in this application. A system includes a battery cell, the battery cell includes an excess amount of cathode or anode that can function as half cells in an emergency. A user, such as a pilot, can command a controller to utilize unrecoverable energy based on battery data presented to the user.

20 Claims, 6 Drawing Sheets

SYSTEM AND METHOD FOR USING UNRECOVERABLE ENERGY IN A BATTERY CELL

FIELD OF THE INVENTION

The present invention generally relates to the field of transportation and aircraft. In particular, the present invention is directed to a system and method for using unrecoverable energy in a battery cell.

BACKGROUND

Manned electric vertical take-off and landing (eVTOL) aircraft flight folds the promise of uncongested commuted roadways and air-travel without the presently concomitant fossil fuel usage. eVTOL aircraft flight requires electric energy storage, for example by way of battery cells. However, electric aircrafts are limited to the amount of energy they can carry by the energy density of the battery cells. Rechargeable batteries have a lower limit of energy available as to allow for subsequent re-charging without damaging the batteries. Sometimes, in an emergency, a pilot may want to access the full battery energy of a rechargeable battery.

SUMMARY OF THE DISCLOSURE

In an aspect, a system for using unrecoverable energy in a battery cell includes a battery cell comprising an electrode with excess material, a sensor connected to the battery cell, the sensor configured to detect battery data, a controller communicatively connected to the sensor, the controller configured to: receive battery data from the sensor, transmit the battery data to a user, receive a command from the user, and utilize unrecoverable energy in the battery cell as a function of the command from the user.

In another aspect, a method for using unrecoverable energy in a battery cell includes receiving a battery cell comprising an electrode with excess material, detecting, by a sensor connected to the battery cell, battery data, receiving, by a controller, battery data from the sensor, transmitting, by the controller, the battery data to a user, receiving, by the controller, a command from the user, and utilizing, by the controller, unrecoverable energy in the battery cell as a function of the command from the user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted

DETAILED DESCRIPTION

At a high level, aspects of the present disclosure are directed to systems and methods for using unrecoverable energy in a battery cell. Unrecoverable energy in a battery cell may be used in emergency scenarios, such as scenarios where a pilot cannot make an emergency landing. Aspects of the present disclosure can be used to double the capacity of a battery cell. This is so, at least in part, because of the excess material in a battery cell. However, once used, unrecoverable energy cannot be recovered and the battery cells may be deemed unusable. Exemplary embodiments illustrating aspects of the present disclosure are described below in the context of several specific examples.

Figure 1:
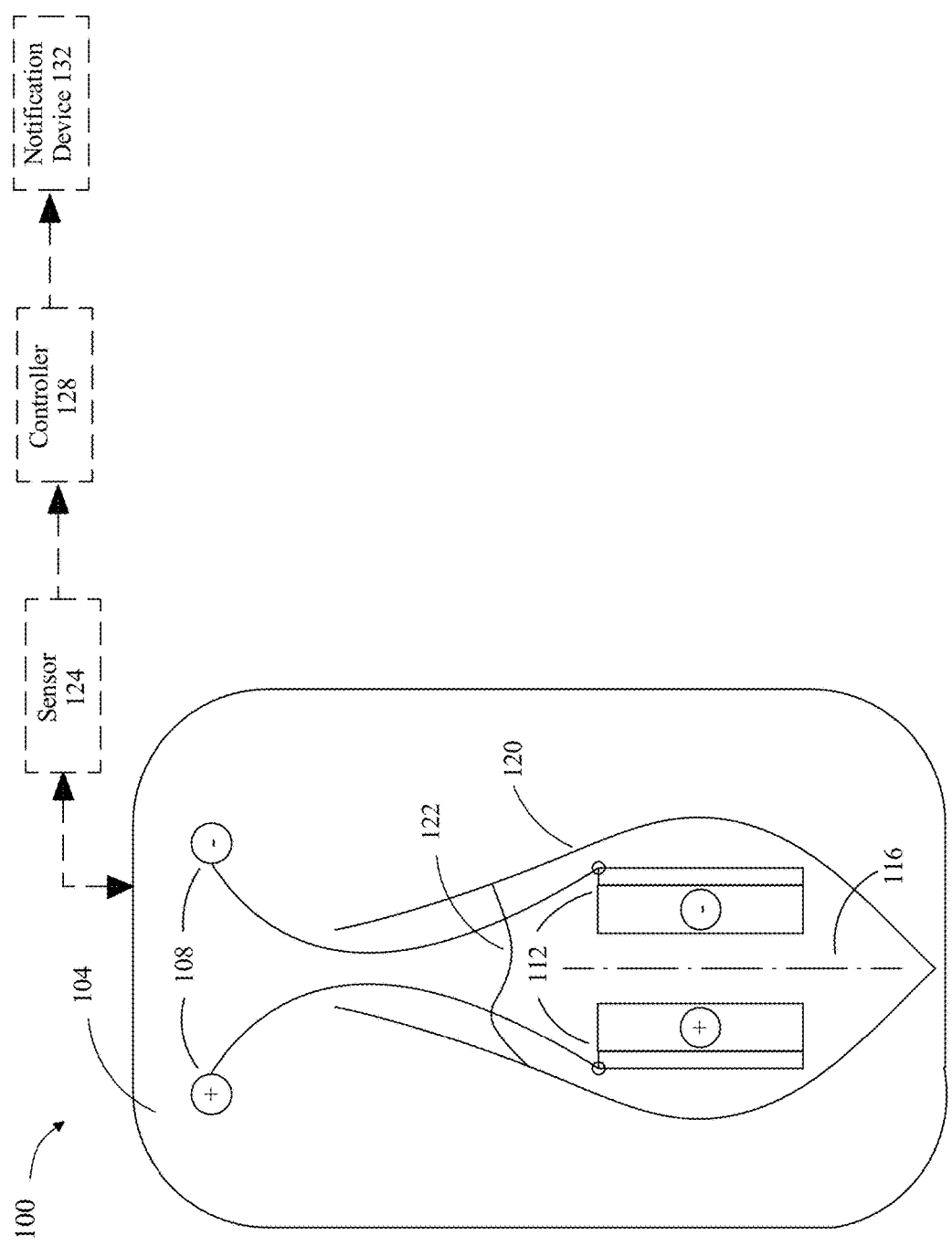
FIG. 1 is a block diagram illustrating a system for using unrecoverable energy in a battery cell.

Referring now to the drawings, FIG. 1 illustrates a block diagram of a system 100 for using unrecoverable energy in a battery cell. As used herein, a "battery cell" refers to a single anode and cathode separated by electrolyte used to produce a voltage and current. A battery cell 104 may include a pouch cell. As used in this disclosure, "pouch cell" is a battery cell or module that includes a pouch. In some cases, a pouch cell may include or be referred to as a prismatic pouch cell, for example when an overall shape of pouch is prismatic. In some cases, a pouch cell may include a pouch which is substantially flexible. Alternatively or additionally, in some cases, pouch may be substantially rigid. Battery cell 104 (also referred to as "cell") includes a first top surface. As used in this disclosure a "top surface" is an upper surface of a cell, wherein the surface is oriented at a position that is furthest from the ground. Additionally or alternatively, cell 104 includes a first bottom surface. As used in this disclosure a "bottom surface" is a lower surface of a cell, wherein the surface is oriented at a position that is closest to the ground. In an embodiment, and without limitation, cell 104 may include an electrode 108. Cell 104 may include a pair of electrodes. As used in this disclosure a "pair of electrodes" is a positive and a negative electrode, wherein an "electrode" is an electrically conductive element. For example, and without limitation, first pair of electrodes 108 may include one or more braided wires, solid wires, metallic foils, circuitries, such as but not limited to printed circuit boards, and the like thereof. In an embodiment, and without limitation, cell 104 may include a tab 112, wherein tab 112 may be in electric communication and/or electrically connected to electrode 108. Tab 112 may be a foil tab. There may be a pair of tabs 112, wherein each electrode 108 is associated with a tab 112. In an embodiment, and without limitation, tabs 112 may be bonded in electric communication with and/or electrically connected to electrodes 108 by any known method, including without limitation welding, brazing, soldering, adhering, engineering fits, electrical connectors, and the like. In some cases, tabs 112 may include a cathode and an anode. As used herein, a "cathode" is an electrode or terminal by which current, conventionally, leaves a battery cell. In other words, a cathode is a positive terminal of the battery cell. As used herein, an "anode" is an electrode or terminal by which current, conventionally, enters a battery cell. In other words, an anode is a negative terminal of the battery cell. In some cases, an exemplary cathode may include a lithium-based substance, such as lithium-metal oxide, bonded to an aluminum foil tab 112. Cathodes may also include lithium cobalt oxide (LCO), lithium nickel manganese cobalt oxide (NMC), lithium nickel cobalt oxide doped with alumina (NCA), lithium manganese oxide (LMO), and lithium iron phosphate (LFP), and the like. In some cases, an exemplary anode may include a carbon-based substance, such as graphite, bonded to a copper tab 112. Cell 104 may include an insulator layer 116. As used in this disclosure, an "insulator layer" is an electrically insulating material that is substantially permeable to battery ions, such as without limitation lithium ions. In some cases, insulator layer may be referred to as a separator layer or simply separator. In an embodiment, and without limitation, insulator layer 116 may be configured to prevent electrical communication directly between pair of tabs 112 such as, but not limited to a cathode and an anode. In some cases, insulator layer 116 may be configured to allow for a flow ions across it. Insulator layer 116 may consist of a polymer, such as without limitation polyolifine (PO). Insulator layer 116 may comprise pours which are configured to allow for passage of ions, for example lithium ions. In some cases, pours of a PO insulator layer 116 may have a width no greater than 100 µm, 10 µm, 1 µm, or 0.1 µm. In some cases, a PO insulator layer 116 may have a thickness within a range of 1-100 µm, or 10-50 µm.

With continued reference to FIG. 1, cell 104 may include a pouch 120. Pouch 120 may be configured to substantially encompass tabs 112 and a portion of insulator layer 116. In some cases, pouch 120 may include a polymer, such as without limitation polyethylene, acrylic, polyester, and the like. In an embodiment, and without limitation, pouch 120 may be coated with one or more coatings. For example, in some cases, pouch 120 may have an outer surface coated with a metalizing coating, such as an aluminum or nickel containing coating. In some cases, pouch coating be configured to electrically ground and/or isolate pouch, increase pouches impermeability, increase pouches resistance to high temperatures, increases pouches thermal resistance (insulation), and the like. Additionally or alternatively, cell 104 may include an electrolyte 122, wherein electrolyte 122 may be located within pouch 120. In some cases, electrolyte 122 may comprise a liquid, a solid, a gel, a paste, and/or a polymer. In an embodiment, and without limitation, electrolyte 122 may wet and/or contact one and/or both of tabs 112. In an embodiment, there may be a different electrolyte 122 for each electrode 108/tab 112. For example, if a cathode is copper, an electrolyte 122 may be CuSO4. If an anode is zinc, an electrolyte 122 may be ZnSO4.

Continuing to reference FIG. 1, cell 104 includes electrodes 108 with excess material. In an embodiment, excess material may include excess cathode or excess anode in tab 112. Excess material may include any excess anode or cathode materials as discussed herein. An excess of material may increase capacity of a cell 104. An excess of material may mean that there is more anode than cathode in a cell 104. Alternatively, an excess of material may mean there is more cathode than anode in a cell 104. In an embodiment, an excess of material may be used in an emergency situation, wherein the excess material may behave as a half cell. An emergency situation may include a battery that is depleted of energy, notwithstanding any additional energy that may be extracted from the battery using over discharge, in an electric aircraft that cannot make an emergency landing (i.e. flying over water). A "half-cell" as used herein, is a structure wherein a metal electrode is in its own electrolyte solution. For example, excess material may act as half-cell when the rechargeable portion of a cell 104 is discharged. In such cases, excess material may be used as a reserve of energy. As used herein, "rechargeable portion" of a cell is the portion of the energy capacity of the cell that may be recharged. As used herein "recharging" is the act of forcing surplus electrons towards the anode, causing an increase in electric potential. Using cell 104 past the recharge portion may also be called "overdischarge". As used herein, "overdischarge" is the state of a cell wherein the battery voltage drops below a threshold voltage. As used herein, a "threshold voltage" is a voltage wherein the battery is discharged to the rechargeable limit. In an embodiment, past the threshold voltage, the battery may be considered overdischarged. In an embodiment, battery voltage is at a threshold voltage when a battery has been discharged at its full capacity. Threshold voltage may be a cutoff point wherein a battery is fully discharged. In overdischarging, the amount of electric discharge may be 1.5, 2, or the like times as great as the capacity of the battery. In an embodiment, overdischarging a cell 104 with 17 Watt hours of rechargeable capacity may result in an extra 33 Watt hours of capacity, totaling 50 Watt hours. "Battery capacity" is defined as the total amount of electricity generated by electrochemical reactions in the battery. "Unrecoverable energy" as used herein, is the extra capacity gained from overdischarge. Unrecoverable energy is unrecoverable as overdischarging a cell 104 may damage the cell 104. In an embodiment, there may be irreversible reactions during the proves of overdischarging a cell 104. Overdischarging a cell 104 may cause the cell 104 to have an increase in internal resistance, preventing recharging. In another embodiment, overdischarging a cell may cause leaking, and the like. In an embodiment, cells 104 may include unrecoverable energy.

Still referring to FIG. 1, in some embodiments, cell 104 may include Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. Batteries and/or battery modules may include without limitation batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. Cell 104 may include lead-based batteries such as without limitation lead acid batteries and lead carbon batteries. Cell 104 may include lithium sulfur batteries, magnesium ion batteries, and/or sodium ion batteries. Batteries may include solid state batteries or supercapacitors or another suitable energy source. Batteries may be primary or secondary or a combination of both. Additional disclosure related to batteries and battery modules may be found in co-owned U.S. Patent Applications entitled "SYSTEM AND METHOD FOR HIGH ENERGY DENSITY BATTERY MODULE" and "SYSTEMS AND METHODS FOR RESTRICTING POWER TO A LOAD TO PREVENT ENGAGING CIRCUIT PROTECTION DEVICE FOR AN AIRCRAFT," having U.S. patent application Ser. Nos. 16/948,140 and 16/590,496 respectively; the entirety of both applications are incorporated herein by reference. Persons skilled in the art, upon reviewing the entirety of this disclosure, will be aware of various devices of components that may be used as a battery module. In some cases, system 100 may be constructed in a manner that vents ejecta, while preventing cell ejecta from one pouch cell from interacting with another pouch cell.

With continued reference to FIG. 1, system 100 may include a sensor 124. As used in this disclosure, a "sensor" is a device that is configured to detect an input and/or a phenomenon and transmit information and/or datum related to the detection. A sensor may generate a sensor output signal, which transmits information and/or datum related to a sensor detection. A sensor output signal may include any signal form described in this disclosure, for example digital, analog, optical, electrical, fluidic, and the like. In some cases, a sensor, a circuit, and/or a controller may perform one or more signal processing steps on a signal. For instance, a sensor, circuit, and/or controller may analyze, modify, and/or synthesize a signal in order to improve the signal, for instance by improving transmission, storage efficiency, or signal to noise ratio. Sensor 124 may include a sensor suite, for example as described with reference to FIGS. 3-4 below. In some cases, sensor 124 may be configured to detect battery data and transmit battery data to a controller 128, which may be communicatively connected to sensor 124. For the purposes of this disclosure, "battery data" represents information and/or a parameter of detected electrical and/or physical characteristic and/or phenomenon correlated with a state of a battery cell. In one or more embodiments, battery data may include data of a parameter regarding a detected state of a battery cell. In one or more embodiments, battery data may include a quantitative and/or numerical value representing a temperature, pressure, moisture level, gas level, orientation, or the like. In another embodiment, battery data may include voltage, capacitance, current, and the like. For example, and without limitation, battery data may include a temperature of 75° F. and a voltage reading of 24V for a battery cell 104. Sensor 124 may be connected to battery cell 104. "Connected" may refer to mechanically connected or communicatively connected. As used herein, "mechanically connected" is a direct or indirect connection between two or more elements using mechanical fasteners such as bolts, rivets, or screws. Sensor 124 may be located on battery cell 104, as shown in FIG. 1. Alternatively, or additionally, sensor 124 may be located in a battery management system (BMS) connected to a cell 104. In an embodiment, system 100 may receive battery data from a BMS. In an embodiment, a controller 128 may receive battery data from sensor 124 and/or BMS.

With continued reference to FIG. 1, system 100 may include a battery management system. A BMS may include a module monitoring unit (MMU) and a pack monitoring unit (PMU) configured to receive battery data from a sensor 124 and transmit battery data to a controller 124. BMS may be used to constantly monitor and log data from each battery cell/battery module/battery pack. BMS is discussed further in FIG. 3. Additional information on a battery management system may be found in U.S. patent application Ser. No. 17/523,896 filed on Nov. 17, 2021 and entitled "SYSTEMS AND METHODS FOR BATTERY MANAGEMENT FOR ELECTRIC AIRCRAFT BATTERIES", which is incorporated by reference in its entirety herein.

Still referencing FIG. 1, system 100 includes a controller 128. Controller 128 is communicatively connected to sensor 124. Controller 128 is configured to receive battery data from sensor 124. Battery data may include data on voltages of battery cell 104, current of cell 104, and the like. Battery data may include a state of charge (SOC), a depth of discharge (DOD), a temperature reading, a moisture/humidity level, a gas level, a chemical level, or the like of a battery cell 104/battery module/battery pack. In an embodiment, a collection of battery cells 104 may form a battery module. In an embodiment, a collection of battery modules may form a battery pack. Sensor 124 may detect battery data from one or all of the above such that controller 128 may receive battery data regarding one battery cell 104, the whole battery module, and/or the battery pack.

In one or more embodiments, controller 128 may include a computing device, which may be implemented in any manner suitable for implementation of a computing device as described in this disclosure, a microcontroller, a logic device, a central processing unit (CPU), a microprocessor, a digital signal processor (DSP), an application specific integrated circuit (ASIC), a control circuit, a combination thereof, or the like. In one or more embodiments, output signals from various components of battery cell 104 may be analog or digital. Controller 128 may convert output signals from sensor 124 to a usable form by the destination of those signals. The usable form of output signals from sensor 124, through processor may be either digital, analog, a combination thereof, or an otherwise unstated form. Processing may be configured to trim, offset, or otherwise compensate the outputs of sensor. Based on sensor output, controller 128 can determine the output to send to a downstream component. Processor can include signal amplification, operational amplifier (Op-Amp), filter, digital/analog conversion, linearization circuit, current-voltage change circuits, resistance change circuits such as Wheatstone Bridge, an error compensator circuit, a combination thereof or otherwise undisclosed components.

In one or more embodiments, controller 128 may be designed and/or configured to perform any method, method step, or sequence of method steps in any embodiment described in this disclosure, in any order and with any degree of repetition. For instance, controller 128 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 128 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, controller 128 is configured to transmit battery data to a user. Battery data may be transmitted to a user by way of a notification device 132. As used in this disclosure, a "notification" is an alert or message sent to the notification device 132 to show a user information on battery data. A notification may provide alerts in various forms, not limited to, an audio alert, a visual alert, a video alert, a tactile alert, a textual alert, or the like. Notification device 132 may show the state of charge of a battery in an aircraft to a user. A user may include a pilot or the like. A user may be any user in a cockpit of an aircraft during flight. As used herein "state of charge" is the level of charge of a battery relative to its capacity. Notification may also contain details of the battery data and an option for user input, discussed below. User may select a corrective action from a database of corrective actions to address the notification. Notification device 132 may also show the voltage threshold. This may communicate whether a battery cell 104 is close to reaching the voltage threshold for overdischarging. Voltage threshold may be displayed with different colored lights, such as red for critical, and green for normal.

Still referencing FIG. 1, controller 128 may compare battery data to a threshold. In an embodiment, threshold may include voltage threshold, state of charge threshold, and the like. Threshold may be predetermined by a pilot and/or operator of the aircraft. For example, a pilot may predetermine that any voltage below 3 volts per cell warrants a notification to notification device 132. In another embodiment, it may be predetermined that a state of charge of battery below 10% warrants a notification. In another embodiment, a state of charge threshold may be at 5% charge remaining. Alternatively, or additionally, notifications may be determined based on flight plan. For example, controller 128 may determine if battery data may fall below a threshold as a function of the remaining distance of the flight plan. In an embodiment, controller 128 may determine that there is not enough capacity left in the battery cells 104 to complete the flight plan. In such cases, notification device 132 may alert the pilot of a potential need to overdischarge the cells 104 to arrive at a location.

Still referencing FIG. 1, and in an embodiment, pilot may provide an alternative corrective action in response to a notification from notification device 132. As used herein, a "corrective action" is a reparative action needed to prevent and/or reduce damage to an aircraft as a result of the battery data. For example, corrective actions may include overdischarging the cells. Corrective action may also include changing the type of landing for the aircraft. For example, conventional landings may use less power than a vertical landing so if battery data falls below a certain threshold, the pilot may issue a corrective action to switch landing types. In another embodiment, corrective action may include adjusting the flight plan. For example, a pilot may choose to land at an earlier location if the battery data has shown that the aircraft does not have enough charge to make it to the desired location. In an embodiment, overdischarging the cells 104 may be a "last resort" corrective action such that it should only occur if it is not avoidable to not damage the battery cells 104.

In one or more embodiments, notification device 132 may include a separate device that includes a transparent screen configured to display computer generated images and/or information. As used herein, a "notification device" is a device to communicate a message to a recipient. As used in this disclosure, a "display" is an image-generating device for the visual representation of at least a datum. In a nonlimiting example, image-generating device may include augmented reality device, various analog devices (e.g., cathode-ray tube, etc.), and digital devices (e.g., liquid crystal, active-matrix plasma, etc.). An "augmented reality" device, as used in this disclosure, is a device that permits a user to view a typical field of vision of the user and superimposes virtual images on the field of vision. Augmented reality device may be implemented in any suitable way, including without limitation incorporation of or in a head mounted display, a head-up display, a display incorporated in eyeglasses, googles, headsets, helmet display systems, or the like, a display incorporated in contact lenses, an eye tap display system including without limitation a laser eye tap device, VRD, or the like. In a non-limiting embodiment, the notification device 132 may be placed in front of the pilot wherein the pilot may view the information displayed. In a non-limiting embodiment, the notification device 132 may be placed between the pilot and the central point of the exterior view window, wherein the exterior view window is configured to provide visibility of the outside environment while the notification device 132 is configured to display information, wherein the information is related to the outside environment. The pilot may view the information and the outside environment with minimal bodily movement of the head of the pilot. The notification device 132 may include a plurality of lines, images, symbols, etc. The lines, images, and symbols may be used to denote the current position, direction, location, state of charge etc., of the electric aircraft. The notification device 132 may further display information describing the aircraft and its functionalities in real-time. The notification device 132 may include alternative information related to communication. The notification device 132 may include one or more projection devices within the display and/or screen of the notification device 132 to display the flight information. Persons skilled in the art, upon reviewing the entirety of this disclosure, will be aware of the various embodiments various flight information may be displayed and placed on the display for purposes as described herein. Additional disclosure related to flight displays can be found in U.S. patent application Ser. No. 17/575,066 entitled "A SYSTEM FOR ESTABLISHING A PRIMARY FLIGHT DISPLAY IN AN ELECTRICAL VERTICAL TAKEOFF AND LANDING AIRCRAFT," entirety of which incorporated herein by reference. In another embodiment, notification device 132 may include any screen in a cockpit of an aircraft. Notification device 132 may be an LED display, OLED display, LCD display, or the like.

Still referring to FIG. 1, controller 128 is configured to receive a command from a user. As used herein, "command" is an instruction given to the controller. For example, a command may include overdischarging the battery cells 104. In another embodiment, command may include not overdischarging the battery cells 104 to preserve the rechargeability of the cells. User may input a command to controller 128 through a notification device 132. For example, a user may select various options on a touch screen, flip a manual switch, press a physical button or a button on a display, or the like. In an embodiment, a command may be a response to battery data, such as a command to utilize unrecoverable energy in a cell 104. For example, notification device 132 may display a "critical low battery" alert to a user. In response to this, a user may command the controller 128 to overdischarge cells 104 in order to utilize unrecoverable energy. Utilizing unrecoverable energy may include overdischarging the cells 104. Utilizing unrecoverable energy may include overdischarging the cells 104 in order to power the aircraft. Overdischarging cells 104 may allow system 100 to use unrecoverable energy such that it may double the capacity of cells 104. In response to overdischarging cells 104, controller 128 may also lock out the overdischarged cells to prevent future use of the cells 104. As used herein, "lock out" is an act of shutting down and preventing start up of dangerous equipment. As discussed above, overdischarged battery cells 104 may be permanently damaged. In an embodiment, controller 128 may lock out the battery cell 104 that was overdischarged, the whole module including the battery cell 104, and/or the battery pack containing modules with battery cells 104 that were overdischarged. In an embodiment, controller 128 may create a lockout flag, which may be stored in a memory component and/or device that retains information after being powered down. The memory component may be a flash, hard disk memory, secondary memory, or the like. A lockout flag may include an indicator alerting a user a lockout status of various battery cells 104. In one or more embodiments, lockout flag may not be removed until the equipment in question is no longer dangerous. In one or more embodiments, lockout flag may include an alert on a graphic user interface of, for example, a remote computing device, such as a mobile device, tablet, laptop, desktop and the like. In other embodiments, lockout flag may be indicated to a user via an illuminated LED that is remote or locally located on battery pack, battery cell 104, and/or battery module. In an embodiment, an aircraft with locked out equipment may not start and may alert a pilot of the lock out status of the equipment.

Figure 2:
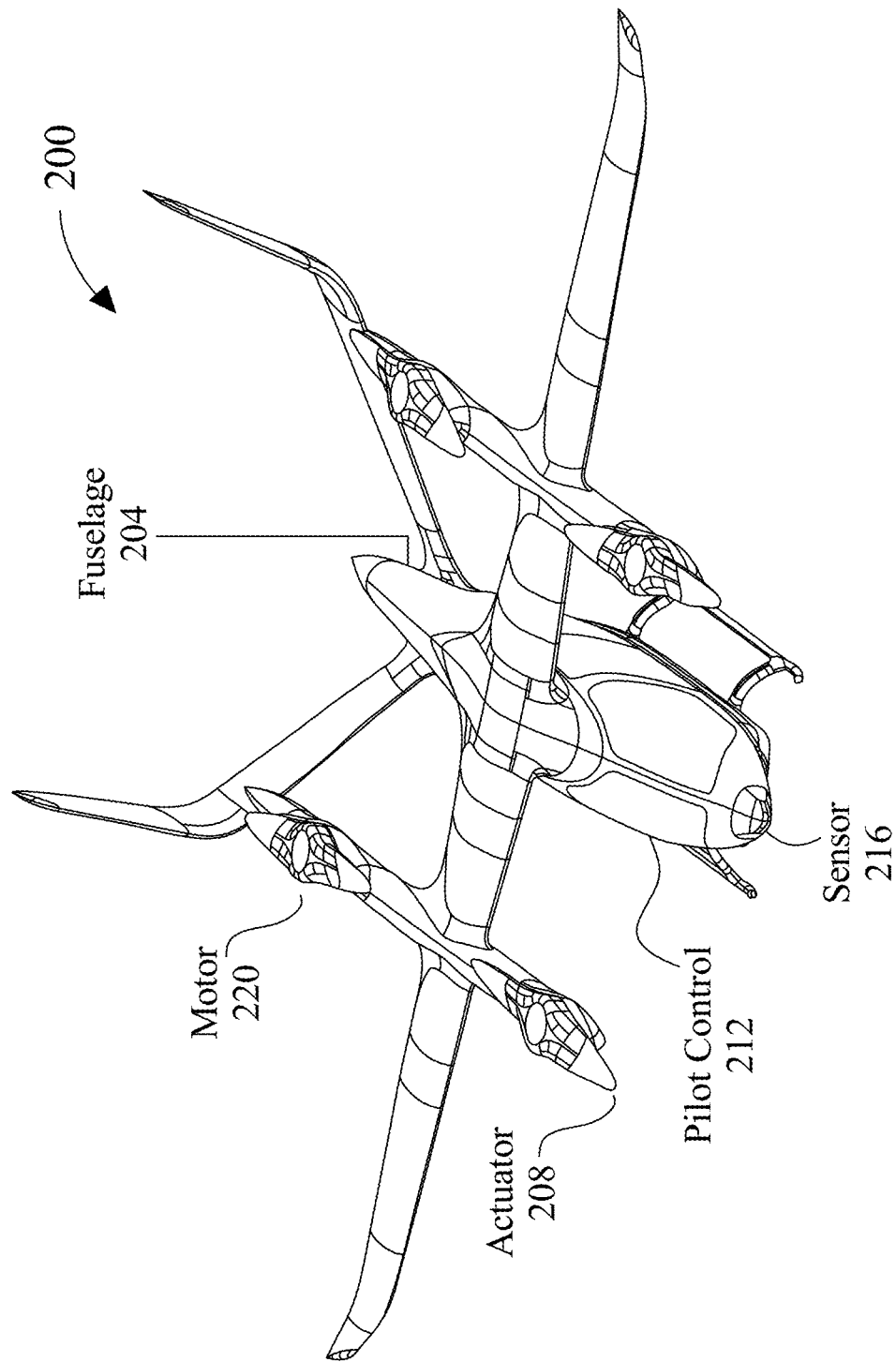
FIG. 2 is a schematic representation of an exemplary electric vertical take-off and landing vehicle.

Referring now to FIG. 2, an exemplary embodiment of an aircraft 200 is illustrated. Aircraft 200 may include an electrically powered aircraft. In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

Still referring to FIG. 2, aircraft 200 may include a fuselage 204. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 204 may comprise structural elements that physically support the shape and structure of an aircraft. Structural elements may take a plurality of forms, alone or in combination with other types. Structural elements may vary depending on the construction type of aircraft and specifically, the fuselage. Fuselage 204 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

Still referring to FIG. 2, aircraft 200 may include a plurality of actuators 208. In an embodiment, actuator 208 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is vehicle that may fly. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 2, a plurality of actuators 208 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 208 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of actuators 208 may include a rudder, which may include, without limitation, a segmented rudder that produces a torque about a vertical axis. Additionally or alternatively, plurality of actuators 208 may include other flight control surfaces such as propulsors, rotating flight controls, or any other structural features which can adjust movement of aircraft 200. Plurality of actuators 208 may include one or more rotors, turbines, ducted fans, paddle wheels, and/or other components configured to propel a vehicle through a fluid medium including, but not limited to air.

Still referring to FIG. 2, plurality of actuators 208 may include at least a propulsor component. As used in this disclosure a "propulsor component" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 2, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 2.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 2.3° inward, wherein propulsor component may be rotated and/or shifted to a second angle of 1.7° outward.

Still referring to FIG. 2, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 2, plurality of actuators 208 may include power sources, control links to one or more elements, fuses, and/or mechanical couplings used to drive and/or control any other flight component. Plurality of actuators 208 may include a motor that operates to move one or more flight control components and/or one or more control surfaces, to drive one or more propulsors, or the like, wherein a motor is described below. A motor may be driven by a motor drive, such as without limitation a direct current (DC) electric power and may include, without limitation, brushless DC electric motors, switched reluctance motors, induction motors, or any combination thereof. Alternatively or additionally, a motor drive may include an inverter. A motor drive may also include electronic speed controllers, inverters, or other components for regulating motor speed, rotation direction, and/or dynamic braking.

Still referring to FIG. 2, plurality of actuators 208 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Energy source may include a battery pack/battery cell, for example as described in reference to FIG. 1. Configuration of an energy source containing connected modules may be designed to meet an energy or power requirement and may be designed to fit within a designated footprint in an electric aircraft in which system may be incorporated.

In an embodiment, and still referring to FIG. 2, an energy source may be used to provide a steady supply of electrical power to a load over a flight by an electric aircraft 200. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 2, an energy source may include a plurality of energy sources (such as a plurality of battery cells 104), referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/948,140 both entitled "SYSTEM AND METHOD FOR HIGH ENERGY DENSITY BATTERY MODULE" by S. Donovan et al., which are incorporated in their entirety herein by reference.

Still referring to FIG. 2, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 2, another exemplary actuator may include landing gear. Landing gear may be used for take-off and/or landing/Landing gear may be used to contact ground while aircraft 200 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

Still referring to FIG. 2, aircraft 200 may include a pilot control 212, including without limitation, a hover control, a thrust control, an inceptor stick, a cyclic, and/or a collective control. As used in this disclosure a "collective control" is a mechanical control of an aircraft that allows a pilot to adjust and/or control the pitch angle of the plurality of actuators 208. For example and without limitation, collective control may alter and/or adjust the pitch angle of all of the main rotor blades collectively. For example, and without limitation pilot control 212 may include a yoke control. As used in this disclosure a "yoke control" is a mechanical control of an aircraft to control the pitch and/or roll. For example and without limitation, yoke control may alter and/or adjust the roll angle of aircraft 200 as a function of controlling and/or maneuvering ailerons. In an embodiment, pilot control 212 may include one or more foot-brakes, control sticks, pedals, throttle levels, and the like thereof. In another embodiment, and without limitation, pilot control 212 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 200 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 200 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 2, pilot control 212 may be configured to modify a variable pitch angle. For example, and without limitation, pilot control 212 may adjust one or more angles of attack of a propeller. As used in this disclosure an "angle of attack" is an angle between the chord of the propeller and the relative wind. For example, and without limitation angle of attack may include a propeller blade angled 2.2°. In an embodiment, pilot control 212 may modify the variable pitch angle from a first angle of 2.71° to a second angle of 2.82°. Additionally or alternatively, pilot control 212 may be configured to translate a pilot desired torque. For example, and without limitation, pilot control 212 may translate that a pilot's desired torque for a propeller be 160 lb. ft. of torque. As a further non-limiting example, pilot control 212 may introduce a pilot's desired torque for a propulsor to be 290 lb. ft. of torque. Additional disclosure related to pilot control 212 may be found in U.S. patent application Ser. Nos. 17/001,845 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 2, aircraft 200 may include a loading system. A loading system may include a system configured to load an aircraft of either cargo or personnel. For instance, some exemplary loading systems may include a swing nose, which is configured to swing the nose of aircraft of the way thereby allowing direct access to a cargo bay located behind the nose. A notable exemplary swing nose aircraft is Boeing 747. Additional disclosure related to loading systems can be found in U.S. patent application Ser. No. 17/137,594 entitled "SYSTEM AND METHOD FOR LOADING AND SECURING PAYLOAD IN AN AIRCRAFT" by R. Griffin et al., entirety of which in incorporated herein by reference.

Still referring to FIG. 2, aircraft 200 may include a sensor 216. Sensor 216 may be configured to sense a characteristic of pilot control 212. Sensor may be a device, module, and/or subsystem, utilizing any hardware, software, and/or any combination thereof to sense a characteristic and/or changes thereof, in an instant environment, for instance without limitation a pilot control 212, which the sensor is proximal to or otherwise in a sensed communication with, and transmit information associated with the characteristic, for instance without limitation digitized data. Sensor 216 may be mechanically and/or communicatively coupled to aircraft 200, including, for instance, to at least a pilot control 212. Sensor 216 may be configured to sense a characteristic associated with at least a pilot control 212. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 216 may include at least a geospatial sensor. Sensor 216 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft for both critical and non-critical functions. Sensor may be incorporated into vehicle or aircraft or be remote.

Still referring to FIG. 2, in some embodiments, sensor 216 may be configured to sense a characteristic associated with any pilot control described in this disclosure. Non-limiting examples of a sensor 216 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 216 may sense a characteristic as an analog measurement, for instance, yielding a continuously variable electrical potential indicative of the sensed characteristic. In these cases, sensor 216 may additionally comprise an analog to digital converter (ADC) as well as any additionally circuitry, such as without limitation a Whetstone bridge, an amplifier, a filter, and the like. For instance, in some cases, sensor 216 may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 200, for instance without limitation a computing system, a pilot display, and a memory component. Alternatively or additionally, sensor 216 may sense a characteristic of a pilot control 212 digitally. For instance in some embodiments, sensor 216 may sense a characteristic through a digital means or digitize a sensed signal natively. In some cases, for example, sensor 216 may include a rotational encoder and be configured to sense a rotational position of a pilot control; in this case, the rotational encoder digitally may sense rotational "clicks" by any known method, such as without limitation magnetically, optically, and the like.

Still referring to FIG. 2, electric aircraft 200 may include at least a motor 220, which may be mounted on a structural feature of the aircraft. Design of motor 220 may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor 220 may include two main holes in top and bottom of mounting area to access bearing cartridge. Further, a structural feature may include a component of electric aircraft 200. For example, and without limitation structural feature may be any portion of a vehicle incorporating motor 220, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 208. Persons skilled in the art, upon reviewing the entirety of this disclosure, will be aware of various materials, combinations of materials, and/or constructions techniques.

Still referring to FIG. 2, electric aircraft 200 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 2, a number of aerodynamic forces may act upon the electric aircraft 200 during flight. Forces acting on electric aircraft 200 during flight may include, without limitation, thrust, the forward force produced by the rotating element of the electric aircraft and acts parallel to the longitudinal axis. Another force acting upon electric aircraft 200 may be, without limitation, drag, which may be defined as a rearward retarding force which is caused by disruption of airflow by any protruding surface of the electric aircraft 200 such as, without limitation, the wing, rotor, and fuselage. Drag may oppose thrust and acts rearward parallel to the relative wind. A further force acting upon electric aircraft 200 may include, without limitation, weight, which may include a combined load of the electric aircraft 200 itself, crew, baggage, and/or fuel. Weight may pull electric aircraft 200 downward due to the force of gravity. An additional force acting on electric aircraft 200 may include, without limitation, lift, which may act to oppose the downward force of weight and may be produced by the dynamic effect of air acting on the airfoil and/or downward thrust from the propulsor 208 of the electric aircraft. Lift generated by the airfoil may depend on speed of airflow, density of air, total area of an airfoil and/or segment thereof, and/or an angle of attack between air and the airfoil. For example, and without limitation, electric aircraft 200 are designed to be as lightweight as possible. Reducing the weight of the aircraft and designing to reduce the number of components is essential to optimize the weight. To save energy, it may be useful to reduce weight of components of electric aircraft 200, including without limitation propulsors and/or propulsion assemblies. In an embodiment, motor 220 may eliminate need for many external structural features that otherwise might be needed to join one component to another component. Motor 220 may also increase energy efficiency by enabling a lower physical propulsor profile, reducing drag and/or wind resistance. This may also increase durability by lessening the extent to which drag and/or wind resistance add to forces acting on electric aircraft 200 and/or propulsors.

Figure 3:
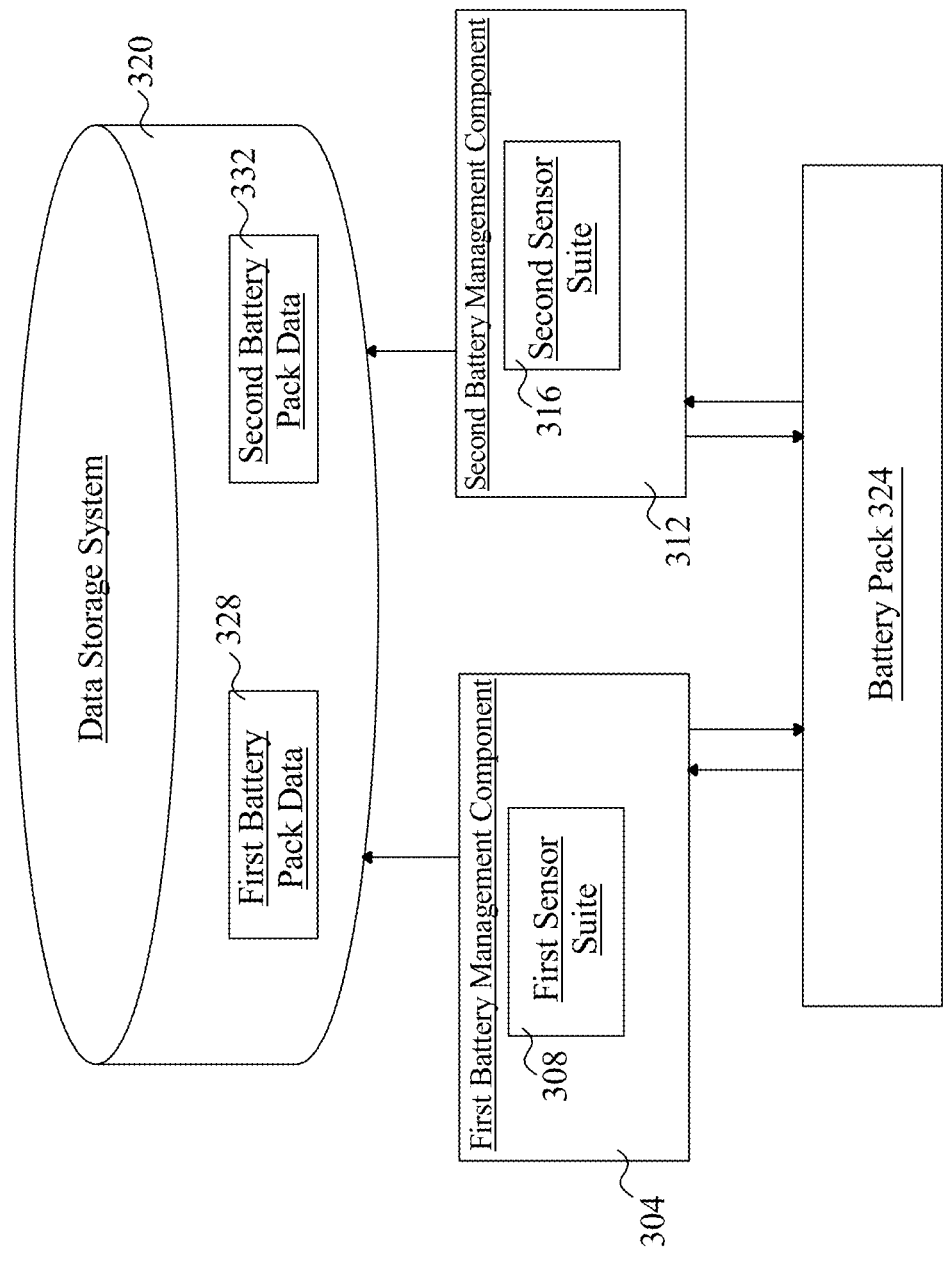
FIG. 3 is a block diagram of an exemplary battery management system.

Referring now to FIG. 3, an embodiment of battery management system 300 is presented. As used herein, a "battery management system" is any electronic system that manages a rechargeable battery, such as by protecting the battery from operating outside its safe operating area, monitoring its state, calculating secondary data, reporting that data, controlling its environment, authenticating it and/or balancing it. Battery management system 300 is be integrated in a battery pack configured for use in an electric aircraft. The battery management system 300 is be integrated in a portion of the battery pack or subassembly thereof. Battery management system 300 includes first battery management component 304 disposed on a first end of the battery pack. One of ordinary skill in the art will appreciate that there are various areas in and on a battery pack and/or subassemblies thereof that may include first battery management component 304. First battery management component 304 may take any suitable form. In a non-limiting embodiment, first battery management component 304 may include a circuit board, such as a printed circuit board and/or integrated circuit board, a subassembly mechanically coupled to at least a portion of the battery pack, standalone components communicatively coupled together, or another undisclosed arrangement of components; for instance, and without limitation, a number of components of first battery management component 304 may be soldered or otherwise electrically connected to a circuit board. First battery management component may be disposed directly over, adjacent to, facing, and/or near a battery module and specifically at least a portion of a battery cell. First battery management component 304 includes first sensor suite 308. First sensor suite 308 is configured to measure, detect, sense, and transmit first plurality of battery pack data 328 to data storage system 320.

Referring again to FIG. 3, battery management system 300 includes second battery management component 312. Second battery management component 312 is disposed in or on a second end of battery pack 324. Second battery management component 312 includes second sensor suite 316. Second sensor suite 316 may be consistent with the description of any sensor suite disclosed herein. Second sensor suite 316 is configured to measure second plurality of battery pack data 332. Second plurality of battery pack data 332 may be consistent with the description of any battery pack data disclosed herein. Second plurality of battery pack data 332 may additionally or alternatively include data not measured or recorded in another section of battery management system 300. Second plurality of battery pack data 332 may be communicated to additional or alternate systems to which it is communicatively coupled. Second sensor suite 316 includes a moisture sensor consistent with any moisture sensor disclosed herein, namely moisture sensor 504.

With continued reference to FIG. 3, first battery management component 304 disposed in or on battery pack 324 may be physically isolated from second battery management component 312 also disposed on or in battery pack 324. "Physical isolation", for the purposes of this disclosure, refer to a first system's components, communicative coupling, and any other constituent parts, whether software or hardware, are separated from a second system's components, communicative coupling, and any other constituent parts, whether software or hardware, respectively. First battery management component 304 and second battery management component 308 may perform the same or different functions in battery management system 300. In a non-limiting embodiment, the first and second battery management components perform the same, and therefore redundant functions. If, for example, first battery management component 304 malfunctions, in whole or in part, second battery management component 308 may still be operating properly and therefore battery management system 300 may still operate and function properly for electric aircraft in which it is installed. Additionally or alternatively, second battery management component 308 may power on while first battery management component 304 is malfunctioning. One of ordinary skill in the art would understand that the terms "first" and "second" do not refer to either "battery management components" as primary or secondary. In non-limiting embodiments, first battery management component 304 and second battery management component 308 may be powered on and operate through the same ground operations of an electric aircraft and through the same flight envelope of an electric aircraft. This does not preclude one battery management component, first battery management component 304, from taking over for second battery management component 308 if it were to malfunction. In non-limiting embodiments, the first and second battery management components, due to their physical isolation, may be configured to withstand malfunctions or failures in the other system and survive and operate. Provisions may be made to shield first battery management component 304 from second battery management component 308 other than physical location such as structures and circuit fuses. In non-limiting embodiments, first battery management component 304, second battery management component 308, or subcomponents thereof may be disposed on an internal component or set of components within battery pack 324.

Referring again to FIG. 3, first battery management component 304 may be electrically isolated from second battery management component 308. "Electrical isolation", for the purposes of this disclosure, refer to a first system's separation of components carrying electrical signals or electrical energy from a second system's components. First battery management component 304 may suffer an electrical catastrophe, rendering it inoperable, and due to electrical isolation, second battery management component 308 may still continue to operate and function normally, managing the battery pack of an electric aircraft. Shielding such as structural components, material selection, a combination thereof, or another undisclosed method of electrical isolation and insulation may be used, in non-limiting embodiments. For example, a rubber or other electrically insulating material component may be disposed between the electrical components of the first and second battery management components preventing electrical energy to be conducted through it, isolating the first and second battery management components from each other.

With continued reference to FIG. 3, battery management system 300 includes data storage system 320. Data storage system 320 is configured to store first plurality of battery pack data 328 and second plurality of battery pack data 332. Data storage system 320 may include a database. Data storage system 320 may include a solid-state memory or tape hard drive. Data storage system 320 may be communicatively coupled to first battery management component 304 and second battery management component 312 and may be configured to receive electrical signals related to physical or electrical phenomenon measured and store those electrical signals as first battery pack data 328 and second battery pack data 332, respectively. Alternatively, data storage system 320 may include more than one discrete data storage systems that are physically and electrically isolated from each other. In this non-limiting embodiment, each of first battery management component 304 and second battery management component 312 may store first battery pack data 328 and second battery pack data 332 separately. One of ordinary skill in the art would understand the virtually limitless arrangements of data stores with which battery management system 300 could employ to store the first and second plurality of battery pack data.

Referring again to FIG. 3, data storage system 320 stores first plurality of battery pack data 328 and second plurality of battery pack data 332. First plurality of battery pack data 328 and second plurality of battery pack data 332 may include total flight hours that battery pack 324 and/or electric aircraft have been operating. The first and second plurality of battery pack data may include total energy flowed through battery pack 324. Data storage system 320 may be communicatively coupled to sensors that detect, measure and store energy in a plurality of measurements which may include current, voltage, resistance, impedance, coulombs, watts, temperature, or a combination thereof. Additionally or alternatively, data storage system 320 may be communicatively coupled to a sensor suite consistent with this disclosure to measure physical and/or electrical characteristics. Data storage system 320 may be configured to store first battery pack data 328 and second battery pack data 332 wherein at least a portion of the data includes battery pack maintenance history. Battery pack maintenance history may include mechanical failures and technician resolutions thereof, electrical failures and technician resolutions thereof. Additionally, battery pack maintenance history may include component failures such that the overall system still functions. Data storage system 320 may store the first and second battery pack data that includes an upper voltage threshold and lower voltage threshold consistent with this disclosure. First battery pack data 328 and second battery pack data 332 may include a moisture level threshold. The moisture level threshold may include an absolute, relative, and/or specific moisture level threshold. Battery management system 300 may be designed to the Federal Aviation Administration (FAA)'s Design Assurance Level A (DAL-A), using redundant DAL-B subsystems.

Figure 4:
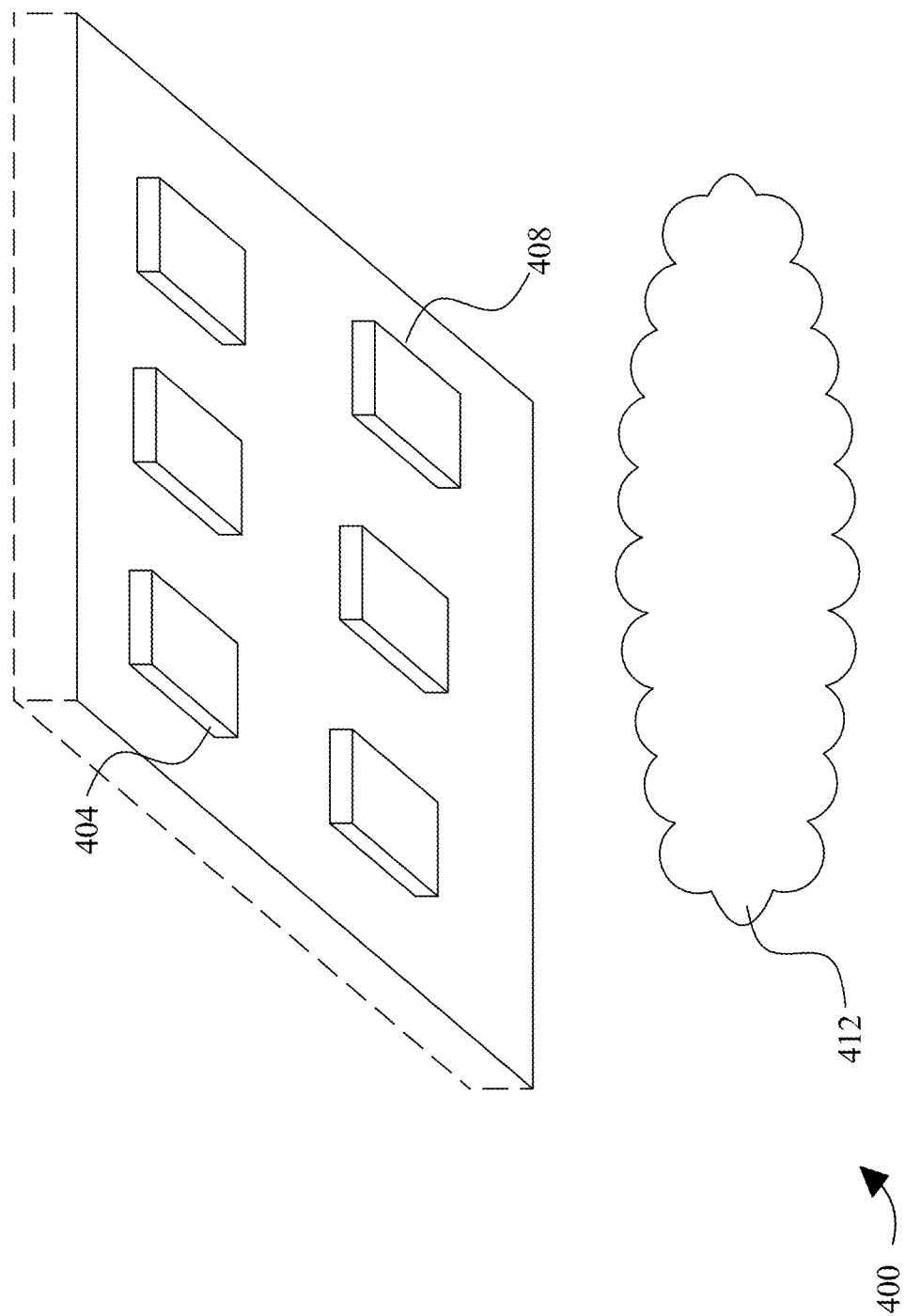
FIG. 4 is an illustration of a sensor suite in partial cross-sectional view.

Referring now to FIG. 4, an embodiment of sensor suite 400 is presented. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack 324 measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of battery management system 300 and/or user to detect phenomenon is maintained and in a non-limiting example, a user alter aircraft usage pursuant to sensor readings.

In an embodiment, and still referring to FIG. 4, sensor suite 400 may include a moisture sensor 404. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Moisture sensor 404 may be psychrometer. Moisture sensor 404 may be a hygrometer. Moisture sensor 404 may be configured to act as or include a humidistat. A "humidistat", for the purposes of this disclosure, is a humidity-triggered switch, often used to control another electronic device. Moisture sensor 404 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 4, sensor suite 400 may include electrical sensors 408. Electrical sensors 408 may be configured to measure voltage across a component, electrical current through a component, and resistance of a component. Electrical sensors 408 may include separate sensors to measure each of the previously disclosed electrical characteristics such as voltmeter, ammeter, and ohmmeter, respectively.

Alternatively or additionally, and with continued reference to FIG. 4, sensor suite 400 include a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. Sensor suite 400 and/or a control circuit incorporated therein and/or communicatively connected thereto may be configured to adjust charge to one or more battery cells as a function of a charge level and/or a detected parameter. For instance, and without limitation, sensor suite 400 may be configured to determine that a charge level of a battery cell is high based on a detected voltage level of that battery cell or portion of the battery pack. Sensor suite 400 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 400 may include digital sensors, analog sensors, or a combination thereof. Sensor suite 400 may include digital-to-analog converters (DAC), analog-to-digital converters (ADC, A/D, A-to-D), a combination thereof, or other signal conditioning components used in transmission of a first plurality of battery pack data 428 to a destination over wireless or wired connection.

With continued reference to FIG. 4, sensor suite 400 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite 400, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 4, sensor suite 400 may include a sensor configured to detect gas that may be emitted during or after a cell failure. "Cell failure", for the purposes of this disclosure, refers to a malfunction of a battery cell, which may be an electrochemical cell, that renders the cell inoperable for its designed function, namely providing electrical energy to at least a portion of an electric aircraft. By products of cell failure 412 may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 400, may be configured to detect combustible, flammable, toxic, oxygen depleted, a combination thereof, or another type of gas alone or in combination. The gas sensor that may be present in sensor suite 400 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 400 may include sensors that are configured to detect non-gaseous byproducts of cell failure 412 including, in non-limiting examples, liquid chemical leaks including aqueous alkaline solution, ionomer, molten phosphoric acid, liquid electrolytes with redox shuttle and ionomer, and salt water, among others. Sensor suite 400 may include sensors that are configured to detect non-gaseous byproducts of cell failure 412 including, in non-limiting examples, electrical anomalies as detected by any of the previous disclosed sensors or components.

With continued reference to FIG. 4, sensor suite 400 may be configured to detect events where voltage nears an upper voltage threshold or lower voltage threshold. The upper voltage threshold may be stored in data storage system 420 for comparison with an instant measurement taken by any combination of sensors present within sensor suite 400. The upper voltage threshold may be calculated and calibrated based on factors relating to battery cell health, maintenance history, location within battery pack, designed application, and type, among others. Sensor suite 400 may measure voltage at an instant, over a period of time, or periodically. Sensor suite 400 may be configured to operate at any of these detection modes, switch between modes, or simultaneous measure in more than one mode. First battery management component 404 may detect through sensor suite 400 events where voltage nears the lower voltage threshold. The lower voltage threshold may indicate power loss to or from an individual battery cell or portion of the battery pack. First battery management component 404 may detect through sensor suite 400 events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation.

Figure 5:
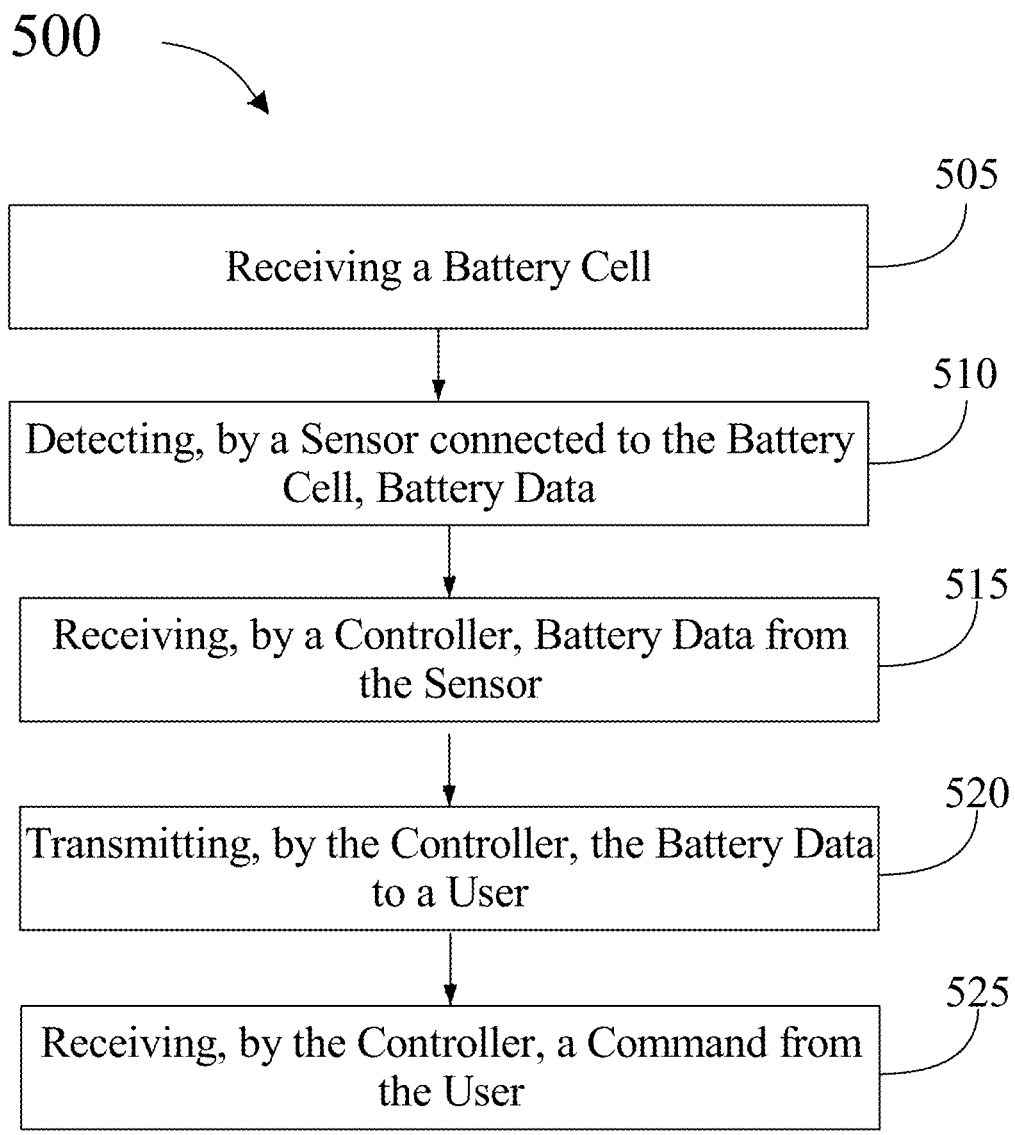
FIG. 5 is a flow diagram of an exemplary method for using unrecoverable energy in a battery cell.

Referring now to FIG. 5, an exemplary method 500 of using unrecoverable energy in a battery cell is illustrated. Step 505 includes receiving a battery cell including an electrode with excess material. Excess material may include excess cathode and/or excess anode. This step may be implemented without limitation as described in FIGS. 1-4.

Step 510 of method 500 includes detecting, by a sensor connected to the battery cell, battery data. Sensor may include a voltage sensor. Sensor may be indirectly connected to battery cell, such as through a battery management system. Method may include communicatively connecting to a battery management system. Battery data may include data on state of charge, voltage, current, and the like of a battery cell. This step may be implemented without limitation as described in FIGS. 1-4.

Step 515 of method 500 includes receiving, by a controller, battery data from the sensor. Controller may receive battery data from a battery management system, which may include a sensor. This step may be implemented without limitation as described in FIGS. 1-4.

Step 520 of method 500 includes transmitting, by the controller, battery data to a user. In an embodiment, method 500 includes a notification device that may be configured to display a notification to a user as a function of battery data. A user may view battery data with a notification device. Notification device may be communicatively connected to the controller.

Step 525 of method 500 includes receiving, by the controller, a command from the user. Command may allow controller to utilize unrecoverable energy in the battery cell. This may involve overdischarging the battery cells. Controller may also lock out the overdischarged battery cells to prevent future use of the cells. This step may be implemented without limitation as described in FIGS. 1-4.

Step 530 of method 500 includes utilizing, by the controller, unrecoverable energy in the battery cell as a function of the command from the user. This step may be implemented without limitation as described in FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
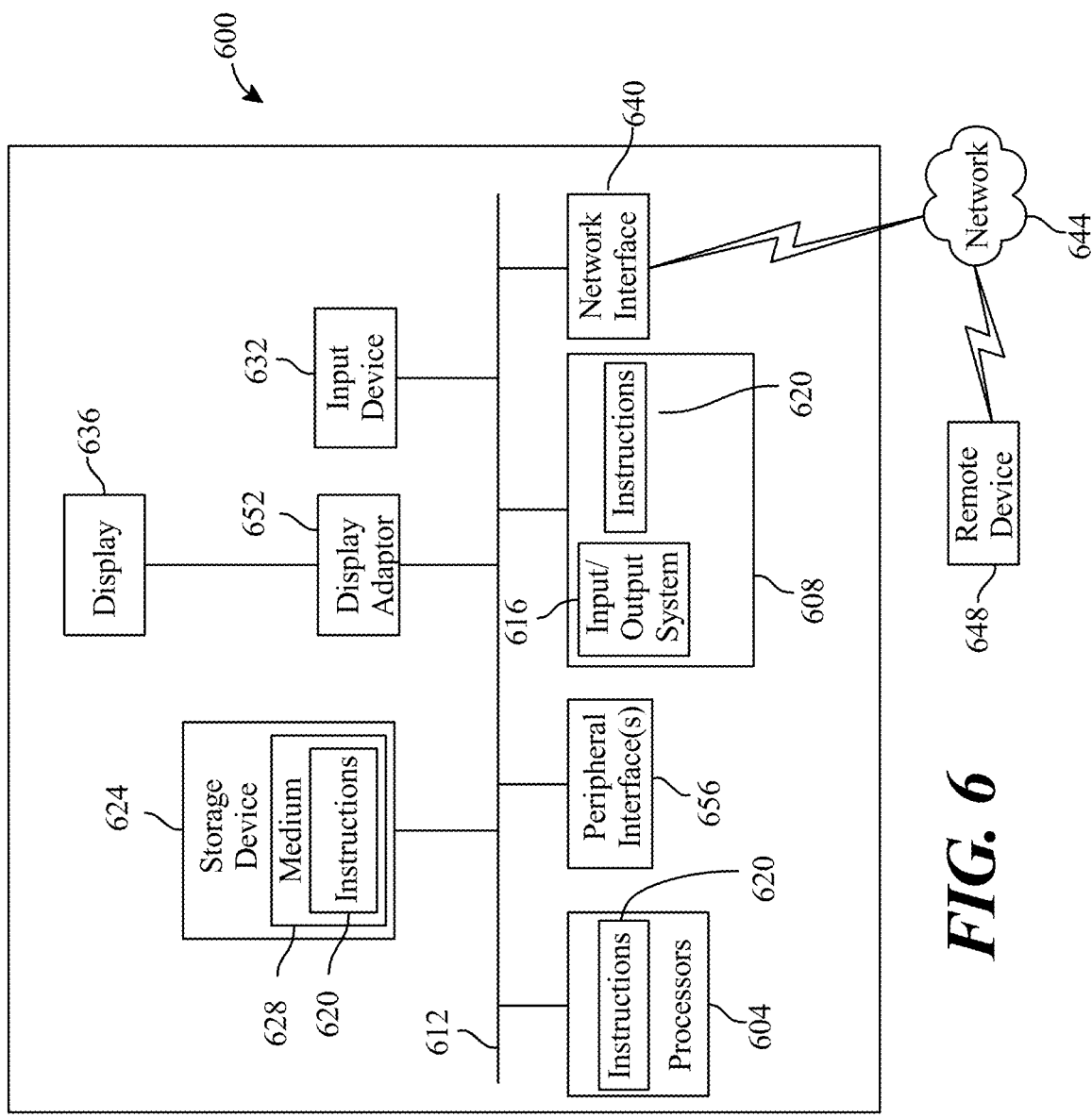
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for using unrecoverable energy in a battery cell, the system comprising:
    a battery cell comprising an electrode with excess material;
    a sensor connected to the battery cell, the sensor configured to detect battery data;
    a controller communicatively connected to the sensor, the controller configured to:
        receive battery data from the sensor;
        transmit the battery data to a user;
        receive a command from the user; and
        utilize unrecoverable energy in the battery cell as a function of the command from the user.

2. The system of claim 1, wherein the excess material comprises excess cathode.

3. The system of claim 1, wherein the excess material behaves like a half-cell.

4. The system of claim 1, wherein the sensor comprises a voltage sensor.

5. The system of claim 1, further comprising a battery management system, wherein the battery management system is communicatively connected to the controller.

6. The system of claim 5, wherein the controller is further configured to receive the battery data from the battery management system.

7. The system of claim 1, wherein utilizing the unrecoverable energy in the battery cell comprises overdischarging the battery cell.

8. The system of claim 7, wherein the controller is further configured to lock out the overdischarged battery cell.

9. The system of claim 1, further comprising a notification device communicatively connected to the controller.

10. The system of claim 9, wherein the notification device is configured to display a notification to the user as a function of the battery data and prompt the user to input a command.

11. A method for using unrecoverable energy in a battery cell, the method comprising:
    receiving a battery cell comprising an electrode with excess material;
    detecting, by a sensor connected to the battery cell, battery data;
    receiving, by a controller, battery data from the sensor;
    transmitting, by the controller, the battery data to a user; and
    receiving, by the controller, a command from the user;
    utilizing, by the controller, unrecoverable energy in the battery cell as a function of the command from the user.

12. The method of claim 11, wherein the excess material comprises excess cathode.

13. The method of claim 11, wherein the excess material behaves like a half-cell.

14. The method of claim 11, wherein the sensor comprises a voltage sensor.

15. The method of claim 11, further comprising communicatively connecting, by the controller, to a battery management system.

16. The method of claim 15, further comprising receiving, by the controller, the battery data from the battery management system.

17. The method of claim 11, further comprising overdischarging, by the controller, the battery cell to utilize unrecoverable energy.

18. The method of claim 1, further comprising locking out, by the controller, the overdischarged battery cell.

19. The method of claim 11, further comprising communicatively connecting a notification device to the controller and prompting the user to input a command.

20. The method of claim 9, further comprising displaying, by the notification device, a notification to the user as a function of the battery data.

* * * * *